No. 609,577. W. B. DUTROW. Patented Aug. 23, 1898.
CONNECTING DEVICE FOR SPRINGS.
(Application filed Apr. 9, 1898.)
(No Model.)
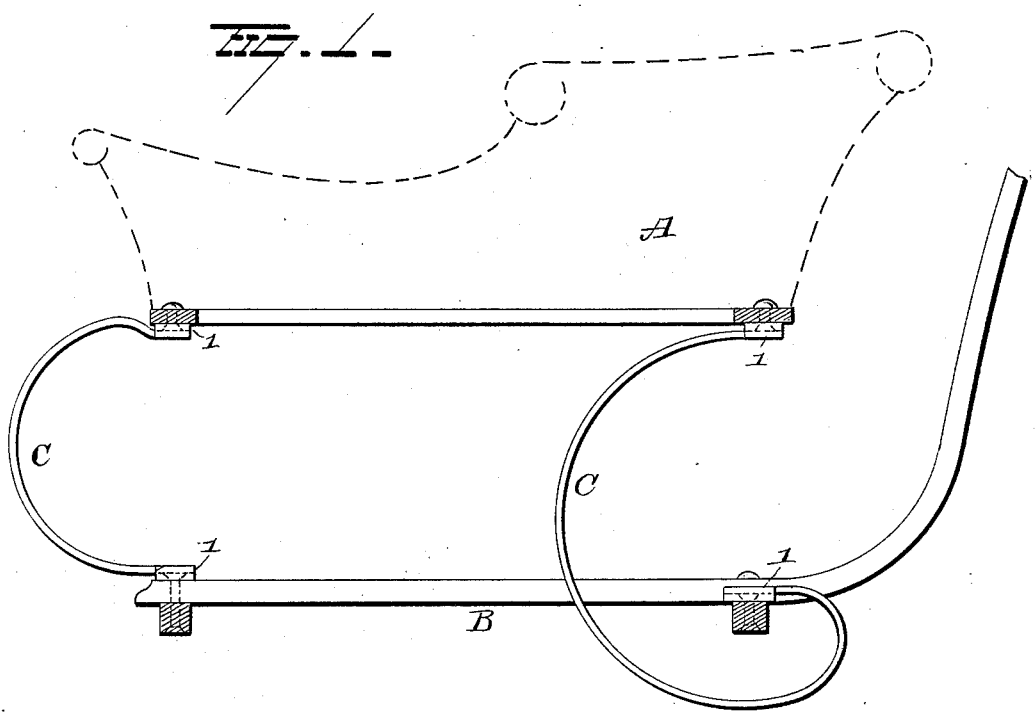
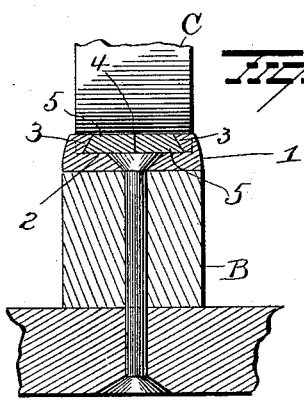
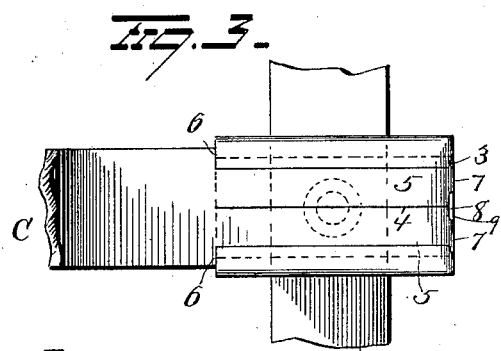
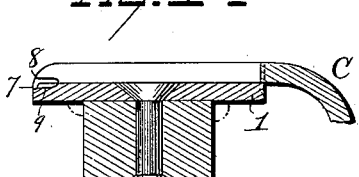
WITNESSES
E. J. Nottingham
G. F. Downing
INVENTOR
W. B. Dutrow
By H. A. Seymour
Attorney

UNITED STATES PATENT OFFICE.

WILLIAM B. DUTROW, OF HARRISONBURG, VIRGINIA.

CONNECTING DEVICE FOR SPRINGS.

SPECIFICATION forming part of Letters Patent No. 609,577, dated August 23, 1898.

Application filed April 9, 1898. Serial No. 677,066. (No model.)

*To all whom it may concern:*

Be it known that I, WILLIAM B. DUTROW, a resident of Harrisonburg, in the county of Rockingham and State of Virginia, have invented certain new and useful Improvements in Connecting Devices; and I do hereby declare the following to be a full, clear, and exact description of the invention, such as will enable others skilled in the art to which it appertains to make and use the same.

My invention relates to an improvement in connecting devices, and more particularly to such as are adapted for connecting the springs of a child's carriage to the running-gear and body thereof.

It is the custom of manufacturers of children's carriages to ship them to the retail dealer in a disassembled or knockdown condition, thus rendering it necessary for a clerk in the retail establishment to assemble the parts before the carriage can be placed on exhibition. The springs on which the body of the carriage is supported have usually been secured to the running-gear by means of bolts having heads on one end and nuts on the other. The use of such devices results in rendering the operation of securing the springs to the running-gear a laborious and tedious task and is at best an unsatisfactory fastening. The nuts on the bolts are apt to and often do become loose and drop off, and sometimes even the bolts themselves become lost. Much annoyance results from the loss of parts of the fastening devices on account of the difficulty to replace them without calling upon the manufacturer for them, and, furthermore, the loss of parts of the connecting or fastening devices results in permitting the springs to become loose, and thus produce a serious source of danger of accident to the carriage and to the occupant thereof.

The objects of my invention are to obviate all the above-mentioned objections heretofore encountered and to provide a connecting device which will result in facilitating the connection of springs to the running-gear and body of a child's carriage, which shall avoid the use of bolts and nuts, which shall result in a saving of time in assembling the parts of the carriage, which shall rigidly secure the springs to the running-gear, which shall be simple in construction, cheap to manufacture, and easy to manipulate, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view illustrating the application of my invention. Figs. 2, 3, and 4 are detail views.

A represents the body of a child's carriage, B a bar of the running-gear, and C the springs between said body and running-gear. All the springs of the carriage (both front and rear) are secured to the running-gear and body in the same manner, and a detailed description of one of such connections will suffice for all.

A plate 1 is secured to the bar B of the running-gear or to the body by means of rivets or other permanent fastening, said plate being provided in its face with a recess 2, having beveled walls 3. The lower end of the spring C is split, as at 4, so as to form two spring-jaws 5 5, the other side or edge of each of which is beveled and adapted to bear against the beveled wall of the recess in the plate 1, so as to form a dovetail connection between the spring and plate. At the inner ends of the jaws 5 the spring is made with shoulders 6, which normally bear against the end of the plate 1, and the free ends of said jaws are made with lips 7, adapted to project over and engage the end of said plate, so as to prevent any possibility of longitudinal displacement of the spring relatively to the plate 1.

From the above construction and arrangement of parts it will be seen that the resilience of the spring-jaws 5 will cause their beveled side edges to bear firmly against the beveled wall of the recess in plate 1, and thus prevent any possibility of vertical displacement of the spring and its jaws. The frictional contact of the side edges of the jaws against the beveled walls of the recess in the plate will also serve to prevent longitudinal movement of the jaws and the spring from which they project; but to avoid any possibility of such displacement the lips 7 are provided, as above explained.

By means of my improvements the springs of a child's carriage can be quickly connected with the running-gear and body by an inexperienced person, and when the connection shall have been effected it will be firm, rigid, and immovable without the application of power, and all possibility of accidental displacement of any character is avoided.

My improvements are very simple in construction, cheap to manufacture, neat in appearance, easy to manipulate, and are effectual in all respects in the performance of their functions.

Should it be desired to disconnect the springs from the running-gear, this can be readily accomplished by means of a simple tool or a nail by raising the free ends of the jaws 5 slightly, so as to disengage them from the plate, when the jaws can be slid out of the recess in the plate. To facilitate the application of such a tool or nail, the free ends of the spring-jaws and the plate may be recessed slightly, as at 8 9. The plate 1 may be provided with one or more ears 10 to engage the part to which it is attached, as shown in dotted lines, Fig. 4.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. The combination with a recessed plate, of a spring provided at its ends with spring-jaws to enter the recess in the plate and bear against the walls thereof, substantially as set forth.

2. The combination with a recessed plate, of a spring having jaws to enter the recess in the plate and lips at the free ends of said jaws and adapted to engage the plate, substantially as set forth.

3. The combination with a recessed plate, of a spring having spring-jaws at one end adapted to enter the recess in the plate, a shoulder on the spring at one end of the jaws to bear against the plate and lips at the free ends of the jaws to engage said plate, substantially as set forth.

4. The combination with a plate having a recess with beveled walls, of a spring having spring-jaws at its end to enter the recess in the plate, said jaws having beveled side edges to bear against the beveled walls of the recess in the plate, substantially as set forth.

5. The combination with a plate and a spring, of spring-jaws at the end of said spring and dovetailed in said plate, substantially as set forth.

6. The combination with the running-gear and body of a carriage, of springs secured at one end to the body, plates secured to the running-gear and body and having recesses, and spring-jaws at the lower end of each spring and adapted to enter the recessed plates so as to have a dovetail connection therewith, substantially as set forth.

In testimony whereof I have signed this specification in the presence of two subscribing witnesses.

WM. B. DUTROW.

Witnesses:
W. H. ROHR,
J. T. HOUCK.